Oct. 4, 1927.
T. H. THOMAS
1,644,551
TRAIN CONTROL DEVICE
Filed Oct. 24, 1925
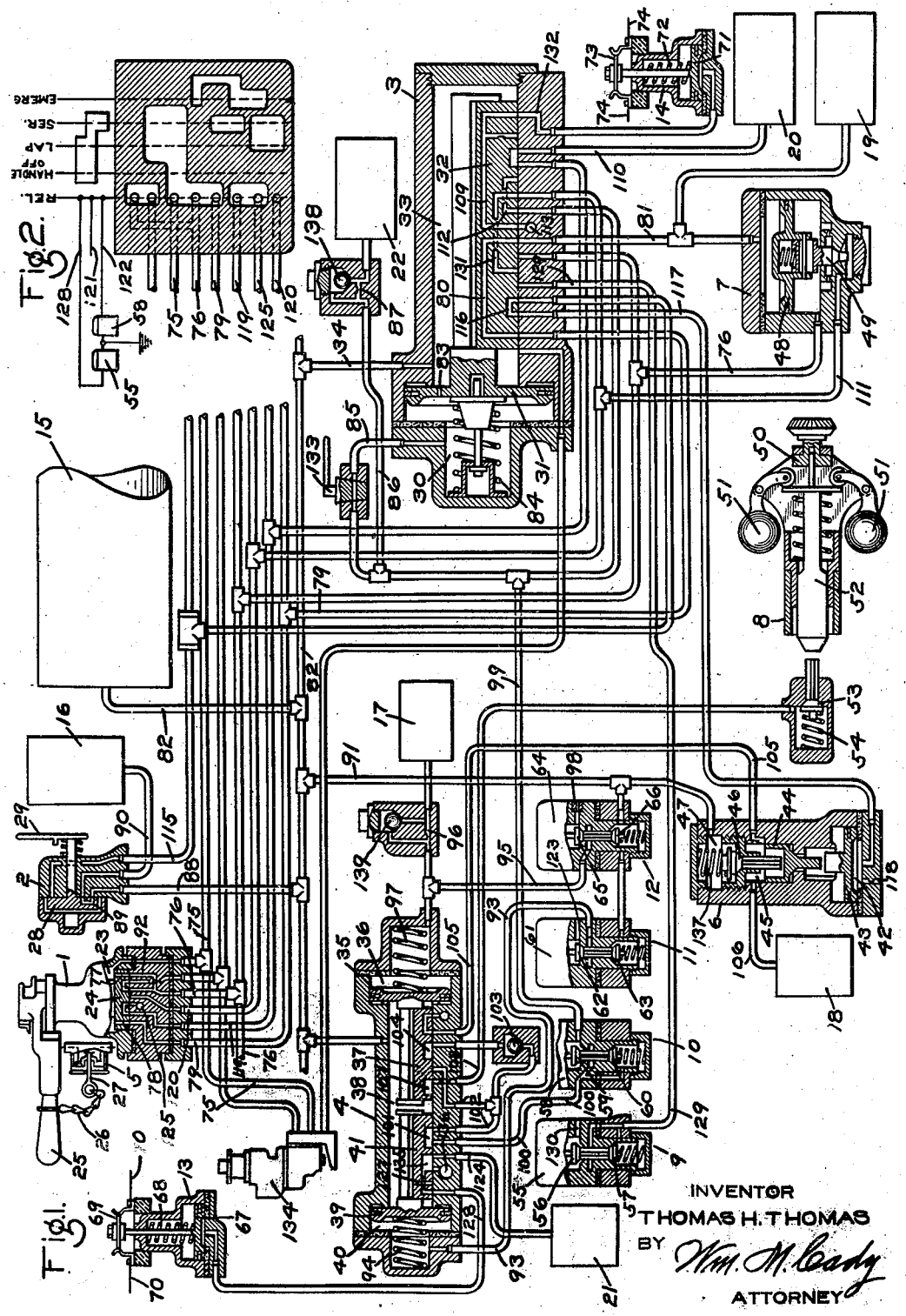
INVENTOR
THOMAS H. THOMAS
BY
Wm. M. Cady
ATTORNEY Patented Oct. 4, 1927.

1,644,551

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

TRAIN-CONTROL DEVICE.

Application filed October 24, 1925. Serial No. 64,576.

This invention relates to automatic speed control apparatus more particularly adapted for use on railway trains.

In the operation of trains equipped with automatic speed control apparatus, there is a possibility that the supply of current, for operating the electrically controlled elements of the control apparatus, may be inadvertently or accidentally cut off without the knowledge of the operator, thereby rendering the control apparatus inoperative.

One object of my invention is to provide means for effecting an application of the brakes upon failure of current supply to the electrically controlled elements of the control apparatus.

It is sometimes desirable, on cars or locomotives equipped with control apparatus, to be able to render the control apparatus inoperative, while said car or locomotive is being moved about the yard by means of another car or locomotive, and to be able to do this without the operator having to leave his post of duty. It is also desirable under conditions just described to ensure that the control apparatus is rendered operative before the car or locomotive is moved under its own power.

Another object of my invention is to provide means for rendering the control apparatus inoperative while the car or locomotive is being towed, said means being operative from the operator's post of duty.

Still another object of my invention is to provide means for ensuring that the control apparatus is cut in before the car or locomotive can be operated under its own power.

Still another object of my invention is to provide electrically operated means, under control of the operator, for suppressing a control brake application.

Other objects and advantages will appear from the following more detailed description of the invention.

In the accompanying drawing: Fig. 1 is a diagrammatic view, partly in section, of an automatic train speed control apparatus embodying my invention; and Fig. 2 a diagrammatic development of the brake valve device employed to control the electric and fluid pressure connections.

In the drawing, I have shown my invention as applied to a double end car, the broken pipes shown in the drawing being adapted to be connected to a brake valve device and acknowledging valve device, of the same type as shown in the drawing, at the opposite end of the car.

As shown in the drawing, the equipment may comprise a brake valve device 1, an acknowledging valve device 2, a brake application valve device 3, a change speed valve portion 4, an acknowledging pilot valve device 6, an equalizing discharge valve device 7, a governor valve device 8, a release magnet valve device 9, a suppression valve device 10, an interlock magnet valve device 11, a speed control magnet valve device 12, and circuit breakers 13 and 14. In addition to the parts just enumerated, reservoirs are provided as follows: a main reservoir 15, an acknowledging reservoir 16, a timing reservoir 17, a stop reservoir 18, an equalizing reservoir 19, a reduction reservoir 20, an interlock application reservoir 21, and an application reservoir 22.

The brake valve device 1 may comprise a casing having a rotary valve chamber 23 containing rotary valve 24, which is adapted to be operated by a removable handle 25. Associated with the brake valve device is a plug switch device 5, including a plug 27 which is connected to the removable brake valve handle 25 by means of a chain 26 and is adapted to control a circuit through which current is supplied to operate magnet valve devices 9, 10, 11, and 12, and since interlock magnet valve device 11 is directly controlled by said supply circuit, magnet 61 will be energized by insertion of plug 27.

It should be understood that the brake valve device also includes switch contacts for controlling the various circuits, the detailed arrangement of which it is not deemed necessary to illustrate, since Fig. 2 clearly shows the electrical connections which are made in the different positions of the brake valve.

The acknowledging valve device 2 may comprise a casing containing a rotary valve 28 which is adapted to be operated by a handle 29 for controlling communication to and from an acknowledging reservoir 16.

The brake application valve device 3 may comprise a casing having a piston chamber 30 containing a piston 31 which is adapted to operate a slide valve 32 contained in valve chamber 33, said valve chamber being connected by pipes 34 and 82 to main reservoir 15.

The change speed valve portion 4 may comprise a casing containing a change speed valve device and an interlock valve device. The change speed valve device may comprise a piston 35 contained in piston chamber 36 and adapted to operate a slide valve 37 contained in valve chamber 38. The interlock valve device may comprise a piston 39 contained in piston chamber 40 and adapted to operate a slide valve 41 contained in valve chamber 38.

The acknowledging pilot valve device 6 may comprise a casing having a piston chamber 42 containing a piston 43, which is adapted to operate a valve piston 44 contained in valve chamber 45 and also a valve 46 subject on one side to the pressure of a spring 137 and contained in valve chamber 47.

The equalizing discharge valve device 7, of the usual construction, comprises a casing containing a piston 48 subject on one side to the pressure of fluid in brake pipe 76 and on the opposite side to the pressure of fluid in equalizing reservoir 19, said piston being adapted to operate a discharge valve 49.

The governor device 8 may comprise a rotatable member 50, operatively connected to the car axle so as to rotate at a speed corresponding to the speed of the car. The member 50 carries governor balls 51, which are adapted to operate a spindle 52, said spindle being adapted to operate a speed control valve 53 normally held seated by a coil spring 54.

The release magnet valve device 9 may comprise a magnet 55 and double beat valves 56 and 57 operable by said magnet. The suppression magnet valve device 10 may comprise a magnet 58 and double beat valves 59 and 60 operable by said magnet. The interlock magnet valve device 11 may comprise a magnet 61 and double beat valves 62 and 63 operable by said magnet. The speed control magnet valve device 12 may comprise a magnet 64 and double beat valves 65 and 66 operable by said magnet.

The circuit breaker 13 may comprise a casing containing a piston 67 subject on one side to the pressure of a coil spring 68 and adapted to operate a movable switch contact 69 so as to open or close a circuit through wire 70. The circuit breaker 14 may comprise a casing containing a piston 71 subject on one side to the pressure of a coil spring 72 and adapted to operate a movable switch contact 73 so as to open or close a circuit through wire 74.

With the brake valve at the operating end of the car in release position, as shown in Fig. 1 of the drawing, and the brake valve on the non-operating end in handle off position, fluid under pressure is supplied from the usual feed valve device 134 through feed valve supply pipe 75, rotary valve chamber 23, port 77 in rotary valve 24 and passage 92 to brake pipe 76, so as to maintain the brake pipe pressure at the normal standard degree of pressure.

Also in this position of the brake valve device, the equalizing reservoir 19 is maintained charged with fluid under pressure from rotary valve chamber 23 and feed valve supply pipe 75 through port 78* in rotary valve 24, passage and pipe 79, cavity 80 in slide valve 32 of the brake application valve device 3, and through pipe 81 to the equalizing reservoir side of piston 48 of equalizing discharge valve device 7 and to the equalizing reservoir 19.

Fluid under pressure from main reservoir 15 flows through pipe 82 to valve chamber 38 of the change speed valve device and interlock valve device and through pipes 82 and 34 to valve chamber 33 of brake application valve device 3. Fluid under pressure then flows through restricted port 83 in piston 31 to piston chamber 30, thereby equalizing the fluid pressures on opposite sides of said piston and permitting a spring 84 to shift the piston 31 and slide valve 32 to the position shown in Fig. 1 of the drawing. Fluid from piston chamber 30 flows through pipes 85 and 86 and restricted passage 87 by passing ball check 138 to application reservoir 22, charging the same, said ball check being provided to permit unrestricted flow from said reservoir to pipe 86 when the pressure of fluid therein is less than the pressure of fluid in the reservoir.

Fluid from main reservoir 15 also flows through pipes 82 and 88, cavity 89 in rotary valve 28 of acknowledging valve device 2 and pipe 90 to acknowledging reservoir 16, charging the same. A pipe 91 leading from pipe 82 also supplies fluid from main reservoir 15 to one side of double beat valve 63 of the interlock magnet valve device and the double beat valve 66 of the speed control magnet valve device and to one side of valve 46 of acknowledging pilot valve device 6.

Assuming that the train is running under a high speed signal indication, the circuits of release magnet 55 and the suppression magnet 58 are controlled by contacts associated with the brake valve and as shown in Fig. 2, in the release position of the brake valve, the circuits of both magnets 55 and 58 are open. The magnet 55 being deenergized causes valve 57 to seat and valve 56 to be unseated. The deenergization of magnet 58 causes valve 60 to seat and valve 59 to be unseated.

Assuming that the plug 27 has been inserted in the switch 5 at one end of the car, the interlock magnet 61 will be energized, since the insertion of the plug closes the supply circuit through which current is supplied to said magnet. When magnet 61 is energized, the valve 62 will be seated and valve 63 unseated so that fluid under pressure always present at one side of valve 63 may flow past said unseated valve and through pipe 93 to piston chamber 40 of the interlock valve device, thereby equalizing pressures of fluid on opposite sides of piston 39 and permitting spring 94 to shift said piston and slide valve 41 to the position shown in Fig. 1.

The signal indication being for high speed, the speed control magnet 64 will be energized, by the operation of track circuits and train apparatus, which it is not deemed necessary to illustrate or describe, causing valve 65 to be seated and valve 66 to be unseated. With valve 66 unseated, fluid under pressure, always present at one side thereof, flows past said unseated valve and through pipe 95 to piston chamber 36 of the change speed valve device, and through restricted passage 96 by passing ball check 139 to timing reservoir 17, charging the same, said ball check being provided so that fluid from reservoir 17 can flow unrestricted to pipe 95 when pressure therein is less than in the reservoir. The pressure of fluid supplied to piston chamber 36, together with the pressure exerted by spring 97, shifts piston 35 and slide valve 37 to the position shown in Fig. 1.

When a low speed signal indication is received, the speed control magnet 64 becomes deenergized, causing valve 66 to be seated and valve 65 to be unseated. With valve 65 unseated, piston chamber 36 of the change speed valve device is connected to atmosphere by way of pipe 95, past unseated valve 65, and through atmospheric exhaust port 98.

The reduction of pressure in piston chamber 36 permits the higher pressure in valve chamber 38 acting on the opposite side of piston 35 to shift said piston and slide valve 37 to low speed position, and if the signal indication is not acknowledged by the operator, fluid from piston chamber 30 of the brake application valve device will be vented to stop reservoir 18 by way of pipes 85 and 99, past unseated valve 59 of suppression magnet valve device 10, pipe 100, cavity 101 in slide valve 41, pipe 102 past ball check 103, cavity 104 in slide valve 37 and through pipe 105 to valve chamber 45, thence through pipe 106.

If the train is exceeding the predetermined low speed limit, fluid from pipe 102 and piston chamber 30 will also be vented to atmosphere through cavity 107 in slide valve 37 and pipe 108 past unseated valve 53, which is unseated by movement of spindle 52 whenever the speed of the train exceeds the low speed limit.

Fluid being vented from piston chamber 30, as just described, permits the higher pressure in valve chamber 33 acting on the opposite side of piston 31 to shift said piston and slide valve 32 to application position. With slide valve 32 in this position, fluid under pressure from equalizing reservoir 19 and one side of equalizing piston 48 is vented to reduction reservoir 20 by way of pipe 81, cavity 109, and pipe 110. The higher pressure in the brake pipe acting on the opposite side of equalizing piston 48 shifts said piston so as to unseat discharge valve 49 and permit brake pipe pressure to flow past said unseated valve and through pipe 111, cavity 112 in slide valve 32 and atmospheric exhaust port 113 to atmosphere, thereby causing an application of the brakes in the usual way.

In application position of slide valve 32, pipe 85 and consequently piston chamber 30 is connected to atmosphere by way of cavity 131 in said slide valve pipe 129, past unseated valve 56 and through atmospheric exhaust port 130, thereby preventing a release of the brakes until certain acts are performed by the operator which will be hereinafter more fully described.

Also in this position of slide valve 32, fluid under pressure from valve chamber 33 and main reservoir 15 is supplied through uncovered passage and pipe 132 to circuit breaker 14. The pressure of fluid so supplied acts to shift piston 71 and movable switch contact 73 to its open position, in which a circuit is opened so that no current can be supplied to the car motors so long as the application valve device remains in application position. When the application slide valve 32 is shifted to release position, fluid is vented from piston 71, permitting the spring 72 to return piston 71 and switch contact 73 to a position in which the circuit is closed so that power may be supplied to the car motors.

When it is desired to release the brakes after an automatic application, the brake valve handle 25 is moved to lap position in which current from supply wire 121 is supplied to wire 128 leading to release magnet 55, thereby energizing said magnet. The energization of magnet 55 causes valve 56 to seat so that pipe 129 and consequently pipe 85 is cut off from atmospheric exhaust port 130.

The brake valve is left in this position for a time interval of sufficient duration to permit fluid under pressure from valve chamber 33 and main reservoir 15 to equalize through port 83 in piston 31 to piston chamber 30 and pipe 85, so that spring 84 may shift piston 31 and slide valve 32 to release position, after which the brake valve handle is moved to release position and the brake pipe pressure built up in the usual way, causing a release of the car brakes.

An automatic application, effected as hereinbefore described, may be prevented if within a predetermined time interval after receiving the low speed signal indication, the operator acknowledges such signal indication by operation of acknowledging valve device 2. In so doing, the operator moves handle 29 and consequently rotary valve 28 to acknowledging position, in which fluid under pressure from acknowledging reservoir 16 is supplied to piston chamber 42 of acknowledging pilot valve device 6 through pipe 90, a cavity in rotary valve 28, pipe 115, cavity 116 in slide valve 32 of brake application valve device 3 and pipe 117.

The pressure of fluid so supplied to piston chamber 42 acts to shift piston 43 inwardly, causing valve piston 44 to move upwardly and valve 46 to be unseated, so that fluid under pressure, always present in valve chamber 47, may flow past said unseated valve and through pipe 106 to stop reservoir 18, charging the same.

The upward movement of valve piston 44 cuts off communication from piston chamber 30 to the stop reservoir 18, through pipe 105, so that fluid will not be vented from said piston chamber to the stop reservoir and thus the movement of the application valve device to application position will be prevented, so long as the valve piston 44 remains in its upper position.

A restricted atmospheric port 118 is connected to piston chamber 42, so that fluid in the acknowledging reservoir 16 slowly discharges to the atmosphere. When the pressure in said reservoir has been reduced to a predetermined degree by venting through restricted port 118, the spring 137 acting on valve 46, together with the pressure of fluid in the stop reservoir 18, acting on valve piston 44, will return the parts to normal position, in which the valve 46 is seated, cutting off communication from supply pipe 91 to the stop reservoir 18 and in which communication is opened from the application piston chamber 30 to the stop reservoir 18. Since the stop reservoir is now charged with fluid under pressure, fluid will not be vented from the application piston chamber 30, as will be evident.

As the piston 43 can be maintained in its upper position only for the time period required to reduce the pressure in the acknowledging reservoir to a predetermined degree, the operator cannot make use of the acknowledging device to permanently cut out the operation of the train control apparatus.

However, if the train is exceeding the low speed limit at the time the signal indication is received, and the operator wishes to prevent the application by acknowledging, he must also suppress the brake application, and this is accomplished by moving the operating brake valve handle to service position. With rotary valve 24 in this position, a service application of the brakes is effected by connecting the equalizing reservoir pipe 79 to reduction reservoir pipe 119 and brake pipe exhaust pipe 120 to atmospheric exhaust port 125. Also in this position of the brake valve a connection is made whereby current from supply wire 121 is supplied to wire 122 leading to suppression magnet valve device 10, thereby energizing magnet 58.

The energization of magnet 58 causes valve 60 to be unseated and valve 59 to be seated so as to cut off communication through pipe 99, thereby preventing the discharge of fluid from piston chamber 30 to atmosphere past unseated valve 53 of the speed governor valve device 8 that would otherwise take place, as hereinbefore described.

It will be understood that the operator must acknowledge a change in signal indication from high to low speed, regardless of the speed of the train, or an application of the brakes will result, since piston chamber 30 of the brake application valve will be connected to stop reservoir 18, even though the speed of the train is below low speed limit.

When the operator desires to change ends, he places the brake valve in handle off position, removes the handle, and withdraws plug 27 from switch 5. The withdrawal of plug 27 opens the supply circuit, through which current is supplied to the interlock magnet 61, thereby deenergizing said magnet. The deenergization of magnet 61 causes valve 63 to seat and valve 62 to be unseated so as to connect piston chamber 40 of interlock valve device to atmosphere by way of pipe 93 past said unseated valve and through atmospheric exhaust port 123.

The resulting reduction of pressure in piston chamber 40 permits the higher pressure in valve chamber 38 acting on the opposite side of piston 39 to shift said piston and consequently slide valve 41 to a position so as to connect pipe 100 and piston chamber 30 of application valve device 3 to interlock application reservoir 21 through cavity 101 and pipe 124, thereby reducing the pressure in piston chamber 30 and causing an automatic application of the brakes in the manner hereinbefore described. Also with slide valve 41 in this position, fluid under pressure from valve chamber 38 and main reservoir 15 is supplied through port 127 in said slide valve, pipe 128 to circuit breaker 13 and actuates piston 67 to move switch contact 69 to a position opening a circuit, so that no power can be supplied to the car motors.

Since in this position of slide valve 41, pipe 100 is connected to reservoir 21, it is not connected to the seat of slide valve 37 of the change speed valve device, movement of which is normally adapted to connect said pipe and piston chamber 30 to the stop reservoir 18 and to one side of valve 23 of the speed governor valve device. Accordingly, with slide valve 41 in the position just described, the control apparatus is effectively cut out.

With the brake valve in handle off position, the release magnet 55 is energized the same as in lap position, as is indicated in Fig. 2, and accordingly valves 56 will be seated so that piston chamber 30 will not be connected to atmosphere when application slide valve 32 moves to application position, as it is when the brake valve is in release position.

Accordingly, when the interlock reservoir 21, the connecting pipes, and piston chamber 30, become charged to the same degree of pressure as valve chamber 33 by flow of fluid therefrom through port 83 in piston 31, spring 84 will shift piston 31 and slide valve 32 to release position. However, the brakes will not be released at this time, since to effect a release it is necessary to place one or the other of the brake valves in release position in order to build up the brake pipe pressure.

When the operator goes to the opposite end of the car, applies the brake valve handle, and then turns the rotary valve to release position, the brake pipe is charged with fluid under pressure and a release of the brakes is effected in the usual way. The car cannot be moved under its own power, however, until the plug 27 is inserted in the switch device at that end of the car, since the interlock valve device is still in the position supplying fluid under pressure to circuit breaker 13, thereby maintaining switch contact 69 in a position which opens a circuit, so that no power can be supplied to the car motors.

When the plug 27 is inserted, the interlock magnet 61 becomes energized, causing valve 62 to be seated and valve 63 to be unseated, thereby permitting fluid under pressure from one side of valve 63 to flow past said unseated valve and through pipe 93 to piston chamber 40 of the interlock valve device. The pressure of fluid so supplied shifts piston 39 and slide valve 41 to a position in which fluid from circuit breaker 13 is vented to atmosphere through pipe 128, cavity 135, and atmospheric exhaust port 136.

When it is desired to cut out the control apparatus, cut-out cock 133 in pipe 85 is turned to a position in which piston chamber 30 is cut off from possible connection to the stop reservoir or speed governor valve by operation of the change speed valve device.

However, since cut-out cock 133 is usually located underneath the car where it requires more or less time and trouble to operate, another method is provided to cut out the control apparatus, so that the car may be either used as a trailer or towed by another car without the functioning of the control apparatus.

According to this method, the plug 27 is first withdrawn from the switch device 5, thereby cutting out the train control apparatus and effecting a brake application, as hereinbefore described. The brake valve handle is then moved to lap position, in which a connection is made energizing release magnet 55, so that the connection of piston chamber 30 to atmosphere through pipe 85, cavity 131, and pipe 129, is cut off, and the brake application valve device 3 will be returned to release position, as before described. The brake valve handle is then moved to release position and the brakes released in the usual way.

Since, with the plug 27 withdrawn, the interlock valve device will remain in the position conecting pipe 100 and piston chamber 30 to interlock application reservoir 21, which is now fully charged, the connection of pipe 100 to the seat of change speed slide valve 37 is cut off, and consequently piston chamber 30 cannot be connected to stop reservoir 18 or valve 53, of the speed governor, by movement of the slide valve 37.

It will now be seen that even though cut-out cock 133 is not closed, the control apparatus will be inoperative, since movement of the change speed slide valve cannot cause an application of the brakes. The car cannot be moved under its own power, however, since with interlock valve device in this position, movable switch contact 69 of circuit breaker 13 is maintained in a position to open a circuit so no current can be supplied to the car motors.

Having now described my invention, what I claim as new and desire to secure by Letters Patent, is:—

1. In a train control apparatus, the combination with electrically controlled means for effecting an application of the brakes, of means operated by the operator upon leaving the operating end of the car for causing said electrically controlled means to effect an application of the brakes.

2. In a train control apparatus, the combination with electrically controlled means for effecting an application of the brakes and for cutting off the supply of power to the car motors, of means operated by the operator upon leaving the operating end of the car for controlling said electrically controlled means.

3. In a train control apparatus, the combination with electrically controlled means for effecting an application of the brakes, of a brake valve device having a removable handle, and means associated with said handle for controlling said electrically controlled means.

4. In a train control apparatus, the combination with electrically controlled means for effecting an application of the brakes, of a brake valve device having a removable handle and a switch device operated upon removal of the handle for opening the circuit of said electrically controlled means.

5. In a train control apparatus, the combination with a valve device operated by a variation in fluid pressure for effecting an application of the brakes of a fluid pressure controlled interlock valve device for controlling the fluid pressure on said brake application valve device, an electrically controlled valve device for varying the fluid pressure on said interlock valve device, a brake valve device having a removable handle, and a switch device operated upon removal of said handle for controlling the circuit of said electrically controlled valve device.

6. In a train control apparatus, the combination with means for effecting an application of the brakes and for cutting off power to the car motors, of electrically controlled means for effecting the operation of said brake application and power cut-off means, a brake valve device having a removable handle, and a switch device operated upon removal of said handle for controlling the circuit of said electrically controlled means.

7. In a train control apparatus, the combination with means normally operative upon a change in the signal indication for effecting an application of the brakes, of electrically controlled means for preventing the operation of said brake application means, and manually operable means for controlling said electrically controlled means.

8. In a train control apparatus, the combination with means normally operative upon a change in the signal indication for effecting an application of the brakes, of electrically controlled means for preventing the operation of said brake application means, a brake valve device, and means operable by the movement of said brake valve device for controlling the circuit of said electrically controlled means.

9. In a train control apparatus, the combination with means normally operative upon a change in the signal indication for effecting an application of the brakes, of electrically controlled means for preventing the operation of said brake application means, a brake valve device having a brake application position, and means operated upon movement of said brake valve device to brake application position for operating said electrically controlled means to permit the operation of said brake application means.

10. In a train control apparatus, the combination with means normally operative upon a change in the signal indication for effecting an application of the brakes, of electrically controlled means for preventing the operation of said brake application means, a brake valve device having a brake application portion and adapted in brake application position to close the circuit of said electrically controlled means, whereby said electrically controlled means is operated to prevent the operation of said brake application means.

11. In a train control apparatus, the combination with a brake application valve device operated upon a reduction in fluid pressure for effecting an application of the brakes, of means adapted in the application position of said valve device to connect said valve device to an exhaust port, and electrically controlled means for controlling said exhaust port.

12. In a train control apparatus, the combination with a brake application valve device operated upon a reduction in fluid pressure for effecting an application of the brakes, of means operated upon movement of said valve device to brake application position for connecting said valve device to an exhaust port, and electrically controlled means for controlling said exhaust port.

13. In a train control apparatus, the combination with a brake application valve device operated upon a reduction in fluid pressure for effecting an application of the brakes, of means operated upon movement of said valve device to brake application position for connecting said valve device to an exhaust port, electrically controlled means for controlling said exhaust port, and manually operable means for controlling said electrically controlled means.

14. In a train control apparatus, the combination with a valve operative to effect an application of the brakes, a piston operated upon a reduction in fluid pressure for operating said valve, said valve having means for connecting said piston to an exhaust port in application position, of electrically controlled means for controlling said exhaust port, and manually controlled means for controlling the circuit of said electrically controlled means.

15. In a train control apparatus, the combination with a valve operative to effect an application of the brakes, a piston operated upon a reduction in fluid pressure for operating said valve, said valve having means for connecting said piston to an exhaust port in application position, of electrically controlled means for controlling said exhaust port, and a brake valve device having means for controlling the circuit of said electrically controlled means.

16. In a train control apparatus, the combination with a valve operative to effect an application of the brakes, a piston operated upon a reduction in fluid pressure for operating said valve, said valve having means for connecting said piston to an exhaust port in application position, of electrically controlled means for controlling said exhaust port, and a brake valve device adapted in lap position to close the circuit of said electrically controlled means and thereby operate same to close said exhaust port.

17. In a train control apparatus, the combination with means normally operative upon a change in the signal indication for effecting an application of the brakes, of electrically controlled means operative upon energization for preventing the operation of said brake application means and means operative upon failure of current for effecting the operation of said brake application means.

18. In a train control apparatus, the combination with a brake pipe, an equalizing reservoir, and a valve device operated upon a reduction in pressure in said equalizing reservoir for venting fluid from the brake pipe, of a reduction reservoir, an application valve device operative to connect said reduction reservoir to said equalizing reservoir, and an engineer's brake valve device also operative to connect said reduction reservoir to said equalizing reservoir.

19. In a train control apparatus, the combination with a brake pipe, an equalizing reservoir, and a valve device operated upon a reduction in pressure in said equalizing reservoir for venting fluid from the brake pipe, of a reduction reservoir, an application valve device operative to connect said reduction reservoir to said equalizing reservoir, and an engineer's brake valve device adapted in one position to connect said reduction reservoir to an exhaust port.

20. In a train control apparatus, the combination with a brake pipe, an equalizing reservoir, and a valve device operated upon a reduction in pressure in said equalizing reservoir for venting fluid from the brake pipe, of a reduction reservoir, an application valve device operative to connect said reduction reservoir to said equalizing reservoir, and an engineer's brake valve device adapted in one position to connect said reduction reservoir to an exhaust port and in another position to said equalizing reservoir.

21. In a train control apparatus, the combination with a brake pipe, an equalizing reservoir, and a valve device operated upon a reduction in pressure in said equalizing reservoir for venting fluid from the brake pipe, of a reduction reservoir, an application valve device operative to connect said reduction reservoir to said equalizing reservoir, and an engineer's brake valve device adapted in one position to connect said reduction reservoir to an exhaust port and in another position to said equalizing reservoir, said application valve device controlling the connection from said reduction reservoir to said brake valve device.

22. In a train speed control apparatus, the combination with a brake application valve device, of a train speed controlled valve, an electrically controlled valve device for controlling communication from said application valve device to said valve, and an interlock valve device for controlling communication through which said valve is connected to said application valve device.

23. In a train speed control apparatus, the combination with a brake application valve device, of a train speed controlled valve, an electrically controlled valve device for controlling communication from said application valve device to said valve, and an interlock valve device for also controlling communication from said application valve device to said valve and from said application valve device to a reduction reservoir.

24. In a train speed control apparatus, the combination with a brake application valve device, of a train speed controlled valve, an electrically controlled valve device for controlling communication from said application valve device to said valve, and an interlock valve device for establishing communication from said application valve device to said valve in one position and from said application valve device to a reduction reservoir in another position.

25. In a train speed control apparatus, the combination with a brake application valve device, of a train speed controlled valve, an electrically controlled valve device for controlling communication from said application valve device to said valve, an interlock valve device for also controlling communication from said application valve device to said valve, and manually controlled means for controlling the circuit of said electrically controlled means.

In testimony whereof I have hereunto set my hand.

THOMAS H. THOMAS.